United States Patent
Miyazaki et al.

(10) Patent No.: US 9,637,116 B2
(45) Date of Patent: May 2, 2017

(54) VEHICLE

(71) Applicant: TOYOTA JIDOSHA KABUSHIKI KAISHA, Toyota-shi, Aichi (JP)

(72) Inventors: Tetsuya Miyazaki, Toyota (JP); Daisuke Nakata, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/109,571

(22) PCT Filed: Oct. 29, 2014

(86) PCT No.: PCT/JP2014/005476
§ 371 (c)(1),
(2) Date: Jul. 1, 2016

(87) PCT Pub. No.: WO2015/114701
PCT Pub. Date: Aug. 6, 2015

(65) Prior Publication Data
US 2016/0325738 A1    Nov. 10, 2016

(30) Foreign Application Priority Data
Jan. 31, 2014   (JP) .................................. 2014-016430

(51) Int. Cl.
*B60W 20/50*   (2016.01)
*B60L 3/00*    (2006.01)
(Continued)

(52) U.S. Cl.
CPC ........... *B60W 20/50* (2013.01); *B60L 3/0076* (2013.01); *B60L 3/0084* (2013.01); *B60L 3/04* (2013.01);
(Continued)

(58) Field of Classification Search
None
See application file for complete search history.

(56) References Cited

U.S. PATENT DOCUMENTS

| | | |
|---|---|---|
| 6,086,166 A | 7/2000 | Fukasawa |
| 2008/0103670 A1 | 5/2008 | Jeon et al. |

(Continued)

FOREIGN PATENT DOCUMENTS

| | | |
|---|---|---|
| JP | H07-215206 A | 8/1995 |
| JP | H07-250402 A | 9/1995 |

(Continued)

*Primary Examiner* — Nicholas Kiswanto
*Assistant Examiner* — Kenny A Taveras
(74) *Attorney, Agent, or Firm* — Oliff PLC (57) ABSTRACT

A vehicle configured to suppress a variation in a deceleration during braking. When a regeneration braking force is generated by a hybrid ECU to brake a hybrid vehicle, and an abnormality occurs to communication between the ECU and a brake ECU, the ECU gradually decreases a magnitude of a target regeneration braking force as the time elapses. On the other hand, the ECU gradually increases a magnitude of a target friction braking force up to a magnitude of a target total braking force as the time elapses. Further, when the vehicle is braked, and power supply to the ECU is shut off to result in an abnormality in the communication between the ECU and the ECU, the ECU finishes the regeneration operation of an electric motor, and the ECU rapidly increases the magnitude of the target friction braking force to the magnitude of the target total braking force.

3 Claims, 5 Drawing Sheets (51) Int. Cl.
  *B60L 3/04* (2006.01)
  *B60L 7/14* (2006.01)
  *B60L 7/26* (2006.01)
  *B60L 11/00* (2006.01)
  *B60L 11/12* (2006.01)
  *B60L 11/14* (2006.01)
  *B60L 11/18* (2006.01)
  *B60L 15/20* (2006.01)
  *B60L 7/10* (2006.01)
  *B60W 10/192* (2012.01)
  *B60W 50/00* (2006.01)

(52) U.S. Cl.
  CPC  *B60L 7/10* (2013.01); *B60L 7/14* (2013.01); *B60L 7/26* (2013.01); *B60L 11/005* (2013.01); *B60L 11/123* (2013.01); *B60L 11/14* (2013.01); *B60L 11/1861* (2013.01); *B60L 11/1868* (2013.01); *B60L 15/2009* (2013.01); *B60W 10/192* (2013.01); *B60L 2210/10* (2013.01); *B60L 2210/40* (2013.01); *B60L 2240/12* (2013.01); *B60L 2240/423* (2013.01); *B60L 2240/80* (2013.01); *B60L 2250/26* (2013.01); *B60L 2270/142* (2013.01); *B60W 2050/0014* (2013.01); *B60W 2050/0063* (2013.01); *Y02T 10/6217* (2013.01); *Y02T 10/645* (2013.01); *Y02T 10/7005* (2013.01); *Y02T 10/7022* (2013.01); *Y02T 10/7044* (2013.01); *Y02T 10/7066* (2013.01); *Y02T 10/7077* (2013.01); *Y02T 10/7216* (2013.01); *Y02T 10/7241* (2013.01); *Y02T 10/7275* (2013.01); *Y02T 90/16* (2013.01); *Y10S 903/947* (2013.01)

(56) References Cited

U.S. PATENT DOCUMENTS

| | | | |
|---|---|---|---|
| 2008/0116744 | A1 | 5/2008 | Kim |
| 2010/0049414 | A1* | 2/2010 | Ohtomo ............... B60L 3/08 701/70 |
| 2010/0268408 | A1* | 10/2010 | Yuki ................... B60L 7/16 701/22 |
| 2014/0062176 | A1* | 3/2014 | Nishida ............... B60T 8/4872 303/3 |
| 2014/0131150 | A1* | 5/2014 | Nimura ............... B60L 1/003 188/158 |
| 2015/0108829 | A1* | 4/2015 | Miyazaki ............. B60T 8/885 303/10 |
| 2015/0191159 | A1* | 7/2015 | Akamine ............. B60T 8/1755 701/22 |
| 2015/0291141 | A1* | 10/2015 | Miyazaki ............. B60T 8/4081 303/10 |
| 2016/0137068 | A1* | 5/2016 | Nada ................... B60L 7/26 701/70 |
| 2016/0159225 | A1* | 6/2016 | Nakatsu ............... B60L 7/26 701/71 |
| 2016/0325738 | A1* | 11/2016 | Miyazaki ............. B60L 3/0076 |
| 2017/0008400 | A1* | 1/2017 | Katsuta ............... B60W 20/14 |
| 2017/0028980 | A1* | 2/2017 | Ogawa ................ B60W 20/14 |
| 2017/0028981 | A1* | 2/2017 | Ogawa ................ B60W 20/14 |
| 2017/0028983 | A1* | 2/2017 | Fukudome .......... B60W 30/025 |

FOREIGN PATENT DOCUMENTS

| | | |
|---|---|---|
| JP | H11-4503 A | 1/1999 |
| JP | 2011-056969 A | 3/2011 |

* cited by examiner

VEHICLE

TECHNICAL FIELD

The present invention relates to a vehicle configured to generate a regeneration braking force by an electric motor and a friction braking force by a friction-type braking apparatus.

BACKGROUND ART

Hitherto, there has been known a brake control apparatus including regeneration braking means for applying a regeneration braking force generated by a motor (electric motor) to wheels, hydraulic pressure braking means (friction-type braking apparatus) for pressing friction members against the wheels via a hydraulic pressure to apply hydraulic pressure braking forces, and control means for cooperatively controlling operations of the regeneration braking means and the hydraulic pressure braking means (for example, refer to Patent Literature 1).

The related-art brake control apparatus is configured so that the control means includes a hybrid ECU (first control unit) and a brake ECU (second control unit) communicating with each other. In this related-art brake control apparatus, the brake ECU calculates a target total braking force to be generated when a vehicle is to be braked. The brake ECU transmits a signal representing the calculated target total braking force via communication to the hybrid ECU. The hybrid ECU receives the signal representing the target total braking force via the communication. The hybrid ECU distributes the target total braking force represented by the received signal to a target regeneration braking force and a target hydraulic pressure braking force. The hybrid ECU transmits a signal representing the distributed target hydraulic pressure braking force to the brake ECU via the communication. The brake ECU receives the signal representing the target hydraulic pressure braking force via the communication. It should be noted that the hybrid ECU may transmit a signal representing the target regeneration braking force to the brake ECU via the communication, and the brake ECU may receive the signal representing the target regeneration braking force via the communication, to thereby determine the target hydraulic pressure braking force from the target total braking force and the received target regeneration braking force.

As a result, the hybrid ECU operates the regeneration braking means in accordance with the target regeneration braking force. Moreover, the brake ECU operates the hydraulic pressure braking means in accordance with the target hydraulic pressure braking force. In this way, in the related-art brake control apparatus, the hybrid ECU and the brake ECU communicate and cooperate with each other, thereby generating the target total braking force.

CITATION LIST

Patent Literature

PTL 1: JP 2011-56969 A

SUMMARY OF INVENTION

In this related-art brake control apparatus, the hybrid ECU and the brake ECU need to be able to communicate with each other in order for the hybrid ECU and the brake ECU to cooperate with each other to precisely generate the target total braking force. However, when the communication between the hybrid ECU and the brake ECU becomes abnormal, reliabilities of the signal representing the target total braking force and transmitted from the brake ECU to the hybrid ECU, and the signal representing the target hydraulic pressure braking force or the target regeneration braking force and transmitted from the hybrid ECU to the brake ECU decrease, resulting in a fear of failure in the realization of the intended cooperative control.

Therefore, the inventor is studying such a configuration that when the communication between the hybrid ECU and the brake ECU becomes abnormal, instead of the cooperative control, the hybrid ECU is controlled to gradually decrease the regeneration braking force, and the brake ECU is controlled to gradually increase the friction braking force in anticipation of the gradual decrease in the regeneration braking force.

By the way, when the occupant of the vehicle operates a main switch (ignition switch) for an instruction of bringing a drive system of the vehicle from an ON state to an OFF state, the hybrid ECU immediately stops the regeneration operation of the electric motor, and enters a shutdown state (non-operation state). As a result, the regeneration braking force by the electric motor rapidly decreases.

On the other hand, when the hybrid ECU is brought into the shutdown state, the brake ECU cannot communicate to/from the hybrid ECU. In this case, the brake ECU determines that an abnormality has occurred to the communication to/from the hybrid ECU, and thus gradually increases the friction braking force even when the hybrid ECU is rapidly decreasing the regeneration braking force. As a result, the magnitude of the actual braking force becomes insufficient for the magnitude of the target total braking force, and a large variation amount is thus generated in deceleration, resulting in a fear of a sense of discomfort felt by the occupants of the vehicle.

The present invention has been made in view of the above-mentioned problem, and therefore one of objects thereof is to provide a vehicle capable of decreasing the variation amount in the deceleration generated on the vehicle during the braking by devising a way of increasing the friction braking force in case of the occurrence of the communication abnormality.

In order to achieve the above-mentioned object, according to one embodiment of the present invention, there is provided a vehicle, including: an electric motor; a first control unit for controlling a regeneration operation of the electric motor to control a regeneration braking force; a friction-type braking apparatus for generating a friction braking force; and a second control unit for controlling an operation of the friction-type braking apparatus to control the friction braking force.

The first control unit and the second control unit are configured to: receive supply of electric power from a power supply; and communicate and cooperate with each other when the first control unit and the second control unit are each in an operation state so as to match an actual braking force, which is a resultant force of the regeneration braking force and the friction braking force, with a magnitude of a target total braking force. It should be noted that such control of the braking force is hereinafter also simply referred to as "brake cooperative control".

The first control unit is configured to: gradually decrease, when the first control unit determines that an abnormality occurs to communication to/from the second control unit, the regeneration braking force as time elapses; and finish, when the supply of the electric power from the power supply is shut off (stopped), the regeneration operation of the electric motor to transition to a non-operation state.

The second control unit is configured to gradually increase, when the second control unit makes such a determination that the supply of the electric power from the power supply to the first control unit is not shut off, and an abnormality occurs to the communication to/from the first control unit (that is, makes a first determination), the friction braking force as the time elapses. In addition, the second control unit is configured to increase, when the second control unit makes such a second determination that the supply of the electric power from the power supply to the first control unit is shut off (that is, makes a second determination), the friction braking force at an increase rate more than an increase rate when the first determination is made. In other words, when the second determination is made, the second control unit is configured to increase the friction braking force more rapidly than when the second control unit increases the friction braking force based on the first determination as the time elapses.

According to one embodiment of the present invention, for example, even when the vehicle is braked by generating the regeneration braking force, and an abnormality occurs to the communication between the first control unit and the second control unit, but a current is supplied to the first control unit, a large variation amount is prevented from being generated in the deceleration of the vehicle. In other words, in this case, the first control unit can gradually decrease the regeneration braking force, and the second control unit can gradually increase the friction braking force within a range up to the magnitude of the target total braking force. Thus, the magnitude of the actual braking force is not severely insufficient with respect to the magnitude of the target total braking force, and a large variation amount is thus not generated in the deceleration. As a result, the occupants of the vehicle are hard to feel a sense of discomfort.

Further, according to one embodiment of the present invention, for example, while the vehicle is braked by generating the regeneration braking force, when the power supply to the first control unit is shut off, an abnormality occurs to the communication between the first control unit and the second control unit, and the first control unit finishes the regeneration operation of the electric motor. As a result, the magnitude of the regeneration braking force rapidly decreases, but the second control unit rapidly increases the magnitude of the friction braking force. Thus, an insufficient amount of the magnitude of the actual braking force with respect to the magnitude of the target total braking force is small, and the variation amount in the deceleration can thus be small. As a result, the vehicle according to the present invention can brake without making the occupants of the vehicle to feel a sense of discomfort.

By the way, the current supply path (specifically a power supply line on which a relay or the like is interposed) for connecting the power supply and the first control unit to each other may temporarily stop the supply of the electric power (power supply) from the power supply to the first control unit due to a temporary line disconnection, an influence of a noise, or the like. On this occasion, for example, when the first control unit is generating the regeneration braking force to brake the vehicle, the first control unit rapidly decreases the magnitude of the regeneration braking force, and the second control unit rapidly increases the friction braking force. By the way, the stop of the power supply may be temporal, and the electric power supply to the first control unit may be resumed within a short period. In this case, the communication between the first control unit and the second control unit becomes normal, and the brake cooperative control described before is thus resumed. If this case frequently occurs, the magnitude of the friction braking force may greatly change, resulting in a frequent change in the magnitude of the actual braking force. As a result, a great variation in the deceleration is frequently generated, and the occupants of the vehicle may feel the sense of discomfort.

In view of this, in the vehicle according to one aspect of the present invention, the first control unit is configured to receive the supply of the electric power from the power supply via a plurality of current supply paths for connecting the power supply and the first control unit to each other, and the second control unit is configured to determine, when the second control unit determines that all the plurality of current supply paths are shut off, that the supply of the electric power from the power supply to the first control unit is shut off.

When this configuration is employed, the electric power is supplied to the first control unit via the plurality of current supply paths, and such a possibility that the entire power supply via the plurality of current supply paths is simultaneously shut off thus decreases. Thus, a possibility of the occurrence of "such a state that the power supply to the first control unit is stopped due to a temporary line disconnection, an influence of a noise, or the like" decreases, and the communication between the first control unit and the second control unit thus does not become abnormal. In addition, when the second control unit determines that all the plurality of the current supply paths are shut off, the second control unit determines that the supply of the electric power from the power supply to the first control unit is shut off, and thus, when the electric power is supplied to the first control unit via at least one current supply path, the second control unit determines that the electric power is supplied to the first control unit. As a result, the vehicle can continue the brake cooperative control.

Conversely, when the entire power supply via all the current supply paths is shut off, the second control unit can surely detect "such a state that the power supply to the first control unit is shut off", and can rapidly increase the magnitude of the friction braking force in anticipation of the rapid decrease in the regeneration braking force. Thus, the vehicle in the above-mentioned aspect can avoid the frequent variation in the magnitude of the actual braking force, and can avoid severe insufficiency in the actual braking force with respect to the target total braking force.

Further, the vehicle according to this aspect includes "a manual switch (for example, a main switch) to be operated by an occupant" and relays to be opened or closed in response to an operation on the manual switch, the relays being interposed in the respective plurality of current supply paths. In addition, the second control unit is configured to connect to "portions for connecting the respective relays and the first control unit to each other" on the respective plurality of current supply paths. In other words, in each current supply path, a portion on a downstream side of the relay with respect to the power supply is connected to the second control unit. In the following, the portions of the current supply paths connected to the first control unit are also referred to as current-supply-path downstream portions.

In the vehicle according to this aspect, the second control unit can determine, based on the electric potentials of "the plurality of current-supply-path downstream portions" connected to the second control unit itself, whether or not the supply of the electric power to the first control unit from the power supply is completely shut off. In other words, the second control unit can appropriately determine the state where the regeneration braking force rapidly decreases without a device provided independently for detecting the supply state of the electric power to the first control unit. The electric power is preferably supplied to the second control unit from the power supply via "the plurality of current-supply-path downstream portions".

DESCRIPTION OF EMBODIMENTS

A description is now given of a vehicle according to an embodiment of the present invention referring to the drawings. This vehicle is a hybrid vehicle including an engine and an electric motor as travel driving sources.

Figure 1:
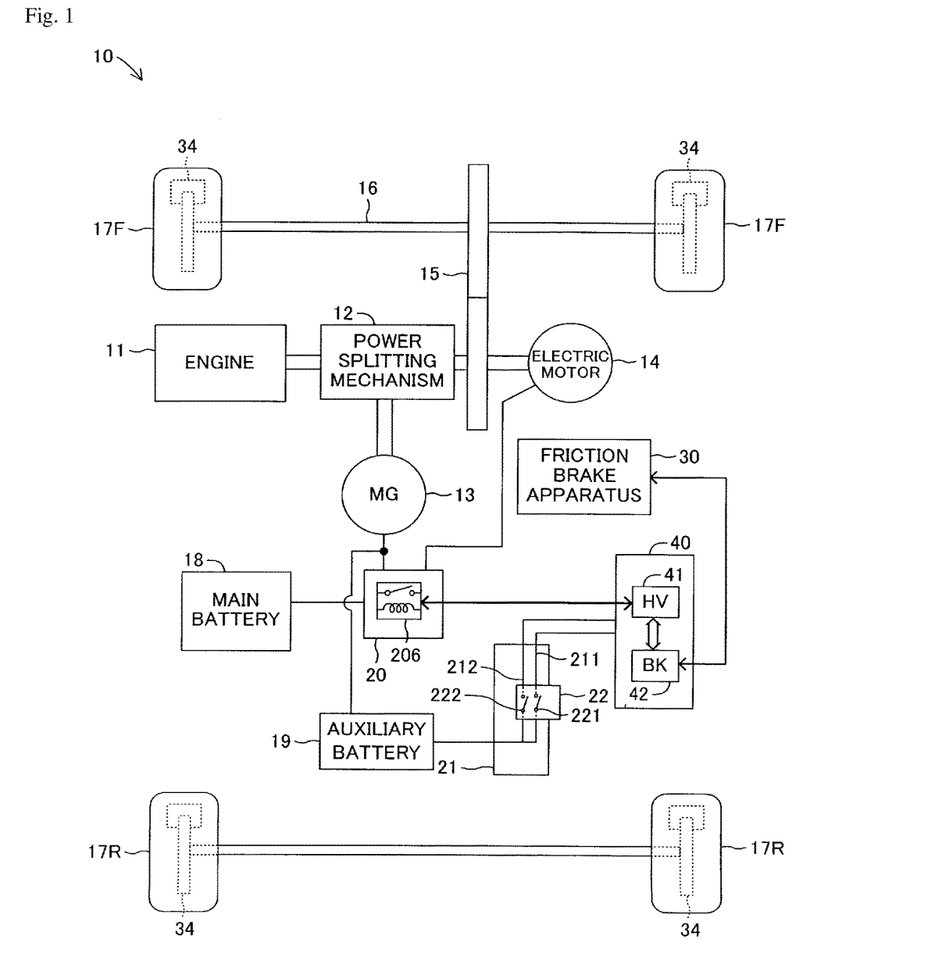
FIG. 1 is a schematic configuration diagram of a hybrid vehicle according to an embodiment of the present invention.

As illustrated in FIG. 1, a hybrid vehicle 10 (hereinafter also simply referred to as "vehicle 10") includes an engine 11, a power splitting mechanism 12, a motor-generator 13, an electric motor 14, a transmission 15, a drive shaft 16, and wheels 17F and 17R. The power of the engine 11 is transmitted via the power splitting mechanism 12, the transmission 15, and the drive shaft 16 to the wheels 17. The power splitting mechanism 12 is, for example, a power splitting mechanism of a three-shaft type including three rotational shafts for a sun gear, a planetary carrier, and a ring gear. A crankshaft of the engine 11, a rotational shaft of the motor-generator 13, and a rotational shaft of the electric motor 14 are connected to the power splitting mechanism 12. The rotational shaft of the motor-generator 13 is rotated by a rotational force transmitted via the power splitting mechanism 12. Therefore, the motor-generator 13 generates electric power. The rotational shaft of the electric motor 14 is connected via the transmission 15 to the power splitting mechanism 12 and the drive shaft 16. Therefore, the driving force of the electric motor 14 is transmitted via the transmission 15 and the drive shaft 16 to the wheels 17. Further, the electric motor 14 is operated for regeneration by regeneration control when the wheels 17F (driving wheels 17F) are braked. Therefore, the electric motor 14 generates regenerative electric power as a result of the regeneration control, and generates regeneration braking forces on the wheels 17 as a result of the regeneration control.

The vehicle 10 includes a main battery 18, an auxiliary battery 19, an electric power converter 20, and a power supply circuit 21. The main battery 18 is a high-voltage rechargeable battery such as a nickel-hydrogen battery or a lithium-ion battery. The main battery 18 supplies electric power to the motor-generator 13 and the electric motor 14 via the electric power converter 20. The main battery 18 stores electric power supplied from the motor-generator 13 via the electric power converter 20. Further, the main battery 18 stores regenerative electric power supplied from the electric motor 14 via the electric power converter 20.

The auxiliary battery 19 is, for example, a low-voltage rechargeable battery such as a lead storage battery. The auxiliary battery 19 is a power supply for vehicle accessories including various electronic control units (ECUs) described later, and supplies electric power to a control apparatus 40 described later via the power supply circuit 21. The auxiliary battery 19 is connected to the motor-generator 13, and stores electric power generated by the motor-generator 13. It should be noted that the auxiliary battery 19 also supplies electric power to the electric power converter 20 and a friction brake apparatus 30, which is not shown.

Figure 2:
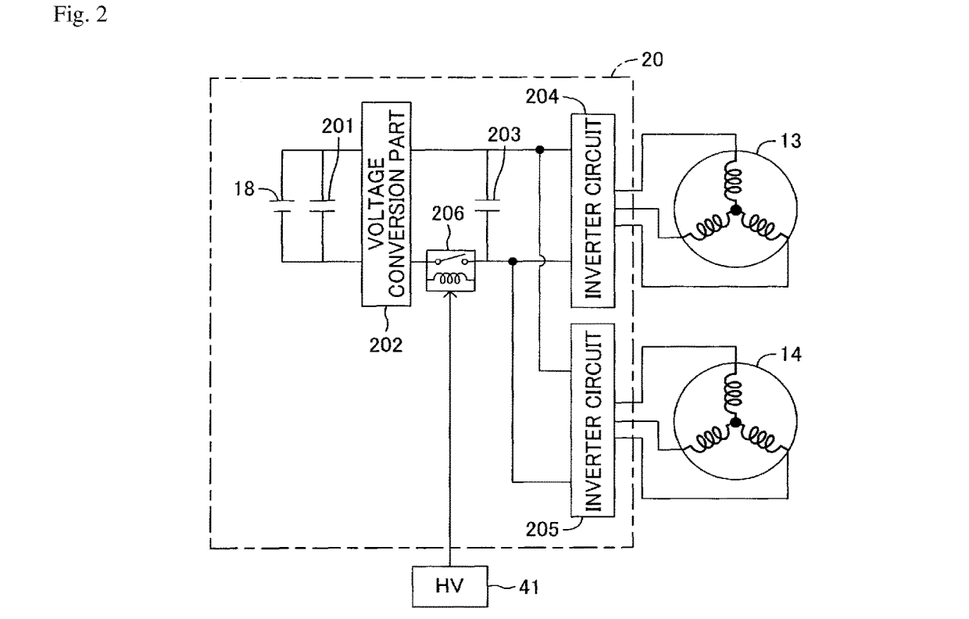
FIG. 2 is a schematic circuit diagram illustrating an electric power converter in FIG. 1.

As illustrated in FIG. 2, the electric power converter 20 is a well-known electric power converter including a smoothing capacitor 201 on the main battery 18 side, a voltage conversion part 202, a smoothing capacitor 203 on a boosting side, and inverter circuits 204 and 205. An operation itself of the electric power converter 20 does not directly relate to the present invention, and a description thereof is therefore omitted. The electric power converter 20 includes a main relay 206. The main relay 206 switches a state of communication between the main battery 18 and the motor-generator 13 or the electric motor 14 between a current supply state of permitting a current supply and a non-current supply state of shutting off the current supply. The main relay 206 is controlled to open or close by a hybrid ECU 41 of the control apparatus 40 described later.

Figure 3:
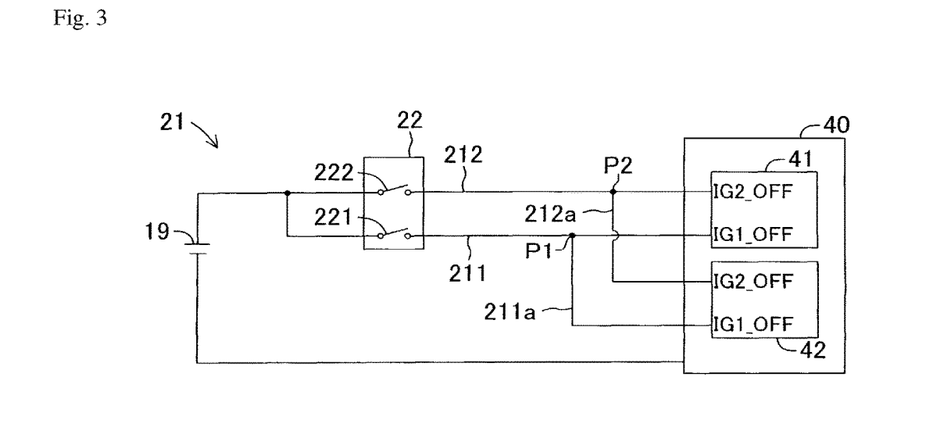
FIG. 3 is a schematic circuit diagram illustrating a power supply circuit in FIG. 1.

As illustrated in FIG. 3, the power supply circuit 21 includes a plurality of (two) current supply paths (electric power supply lines) 211 and 212 connected to the auxiliary battery 19, and a main switch 22. The main switch 22 includes a first relay 221 and a second relay 222. The first relay 221 is serially interposed in the current supply path 211. The second relay 222 is serially interposed in the current supply path 212. When the first relay 221 is closed, the current supply path 211 electrically connects the auxiliary battery 19 and the hybrid ECU 41 with each other to supply the electric power of the auxiliary battery 19 to the hybrid ECU 41. When the second relay 222 is closed, the current supply path 212 electrically connects the auxiliary battery 19 and the hybrid ECU 41 with each other to supply the electric power of the auxiliary battery 19 to the hybrid ECU 41.

"A portion (refer to a point P1) connecting the first relay 221 and the hybrid ECU 41 with each other" of the current supply path 211 is connected via a current supply path (electric power supply line) 211a to a brake ECU 42. Thus, when the first relay 221 is closed, the current supply path 211 and the current supply path 211a electrically connect the auxiliary battery 19 and the brake ECU 42 with each other to supply the electric power of the auxiliary battery 19 to the brake ECU 42.

Similarly, "a portion (refer to a point P2) connecting the second relay 222 and the hybrid ECU 41 with each other" of the current supply path 212 is connected via a current supply path (electric power supply line) 212a to the brake ECU 42. Thus, when the second relay 222 is closed, the current supply path 212 and the current supply path 212a electrically connect the auxiliary battery 19 and the brake ECU 42 with each other to supply the electric power of the auxiliary battery 19 to the brake ECU 42. In this way, the brake ECU 42 is connected to "portions on downstream sides of the first relay 221 and the second relay 222 with respect to the auxiliary battery 19" of the current supply paths 211 and 212.

The main switch 22 is provided, for example, in a vehicle cabin, and occupants including a driver carry out a switching operation on the main switch 22. When the main switch 22 is operated, a state of each of the first relay 221 and the second relay 222 is switched between an ON state (current supply state) and an OFF state (non-current supply state). As described above, the main switch 22 is a switch for switching the power supply state from the auxiliary battery 19 to the control apparatus 40 (the hybrid ECU 41 and the brake ECU 42) between an ON state (current supply state) of supplying the electric power and an OFF state (non-current supply state) of shutting off the supply of the electric power.

On this occasion, in this embodiment, for example, a switch including an operation button to be depressed by the occupant and a spring for pushing back the operation button is employed as the main switch 22. Regarding the main switch 22, when the occupant depresses the operation button from an initial position before the depression to a predetermined depressed position, and then stops the depressing, the spring returns the operation button to the initial position again by a biasing force thereof. When the operation button is depressed from the initial position to the depressed position, and then returns again to the initial position, the switch operation on the main switch 22 by the occupant is completed.

Each time the switch operation on the main switch 22 by the occupant is completed, the first relay 221 and the second relay 222 are switched from the open state (OFF state) to the closed state (ON state) or from the closed state to the open state. Specifically, when the first relay 221 and the second relay 222 are in the open state, the first relay 221 is switched from the open state to the closed state by the displacement of the operation button from the initial position to the depressed position. Moreover, the second relay 222 is switched from the open state to the closed state by the displacement of the operation button from the depressed position to the initial position, namely, the completion of the switch operation. Further, when the first relay 221 and the second relay 222 are in the closed state, the first relay 221 is switched from the closed state to the open state by the displacement of the operation button from the initial position to the depressed position. Moreover, the second relay 222 is switched from the closed state to the open state by the displacement of the operation button from the depressed position to the initial position, namely, the completion of the switch operation.

Figure 4:
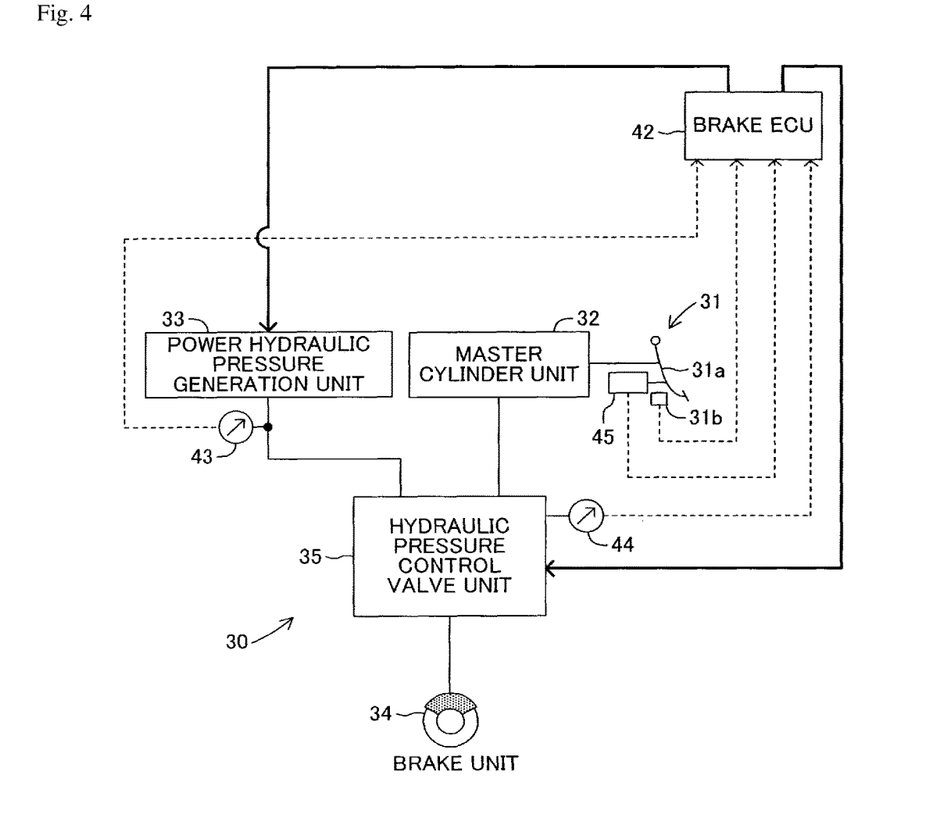
FIG. 4 is a schematic system diagram illustrating a configuration of a friction brake apparatus in FIG. 1.

The friction brake apparatus 30 illustrated in FIG. 1 generates friction braking forces on the wheels 17 (driving wheels 17F and driven wheels 17R). As illustrated in FIG. 4, the friction brake apparatus 30 includes a brake operation unit 31, a master cylinder unit 32, a power hydraulic pressure generation unit 33, a brake unit 34, a hydraulic pressure control valve unit 35, and a connection hydraulic flow passage. The brake operation unit 31 includes a brake pedal 31a operated by the driver. The master cylinder unit 32 includes a master cylinder, a regulator, and a reservoir (all of them are not shown). The power hydraulic pressure generation unit 33 includes an oil pump and an accumulator (both of them are not shown). The brake unit 34 is, for example, a disc brake unit, and includes wheel cylinders arranged on the respective four wheels of the driving wheels 17F and the driven wheels 17R. The hydraulic pressure control valve unit 35 includes various valve apparatus (not shown).

In this configuration, when the driver operates the brake operation unit 31 (specifically, the brake pedal 31a), the master cylinder unit 32 or the power hydraulic pressure generation unit 33 discharges a pressurized working fluid. The discharged working fluid is supplied to the hydraulic pressure control valve unit 35. The hydraulic pressure control valve unit 35 adjusts the hydraulic pressure (fluid pressure) of the supplied working fluid, and supplies the adjusted working fluid to the brake unit 34. The brake unit 34 generates the friction braking forces on the wheels 17 in response to the hydraulic pressure (fluid pressure) of the supplied working fluid. A configuration and an operation of the friction brake apparatus 30 are disclosed in Japanese Patent Application Laid-open No. 2011-56969 and the like, are thus well known, and do not directly relate to the present invention. Thus, the descriptions of a detailed configuration and a detailed operation of the friction brake apparatus 30 are thus omitted.

Referring again to FIG. 1, the control apparatus 40 is installed on the vehicle 10. The control apparatus 40 includes the hybrid ECU 41 as a first control unit and the brake ECU 42 as a second control unit.

The hybrid ECU 41 has a microcomputer including a CPU, a ROM, a RAM, and a timer, and a backup power supply (capacitor) as main components. The hybrid ECU 41 uses detected values of respective sensors (not shown) installed on the engine 11, the electric motor 14, the main battery 18, and the like to control the operations of the engine 11, the motor-generator 13, and the electric motor 14 to control the vehicle 10 to travel. Further, the hybrid ECU 41 operates the main relay 206 of the electric power converter 20 to open or close. Therefore, the hybrid ECU 41 includes a drive circuit for operating the engine 11, the motor-generator 13, the electric motor 14, and the main relay 206, an interface for inputting signals from the respective sensors (not shown), and a communication interface for communicating via a communication line built in the vehicle to/from the brake ECU 42. The communication line built in the vehicle 10 can be the control area network (CAN) or the like, and is hereinafter also simply referred to as "communication line". The hybrid ECU 41 is brought into an operation state (activated state or ON state) when the auxiliary battery 19 supplies the electric power to the hybrid ECU 41. When the supply of the electric power from the auxiliary battery 19 to the hybrid ECU 41 is shut off, the hybrid ECU 41 continues the operation state for a predetermined period by using the backup power supply, carries out necessary shutdown processing during the period, and then enters the non-operation state (OFF state). The operation control by the hybrid ECU 41 for the engine 11, the motor-generator 13, and the electric motor 14 is known, and does not directly relate to the present invention. Therefore, in the following, a detailed description of operation control for the engine 11 and the electric motor 14 by the hybrid ECU 41 (including an engine ECU and a motor ECU which are not shown) is omitted.

The brake ECU 42 has a microcomputer including a CPU, a ROM, a RAM, and a timer, and a backup power supply (capacitor) as main components. The brake ECU 42 includes a drive circuit for driving the power hydraulic pressure generation unit 33 and the hydraulic pressure control valve unit 35 of the friction brake apparatus 30, an interface for inputting the signals from the respective sensors, and a communication interface for communicating via the communication line to/from the hybrid ECU 41. The brake ECU 42 is brought into an operation state (activated state or ON state) when the auxiliary battery 19 supplies the electric power to the brake ECU 42. When the supply of the electric power from the auxiliary battery 19 to the brake ECU 42 is shut off, the brake ECU 42 continues the operation state for a predetermined period by using the backup power supply, carries out necessary processing during the period, and then enters the non-operation state (OFF state).

When the hybrid ECU 41 and the brake ECU 42 are each in an operation state, the hybrid ECU 41 and the brake ECU 42 use the communication line for communication to exchange necessary information. Further, when the brake ECU 42 is in the operation state, the brake ECU 42 repeats transmission of a predetermined response request signal to the hybrid ECU 41 via the communication line built in the vehicle 10 at a preset transmission timing (for example, each time a predetermined period has elapsed). When the hybrid ECU 41 is in the operation state, each time the hybrid ECU 41 receives the response request signal repeatedly transmitted via the communication line, the hybrid ECU 41 transmits a predetermined response signal to the brake ECU 42 via the communication line at a preset transmission timing.

In this case, when the brake ECU 42 receives the response signal from the hybrid ECU 41 until a period set in advance elapses after the transmission of the response request signal to the hybrid ECU 41, the brake ECU 42 determines that the communication via the communication line is normal. On the other hand, when the brake ECU 42 cannot receive the response signal from the hybrid ECU 41 until the period set in advance elapses after the transmission of the response request signal to the hybrid ECU 41, the brake ECU 42 determines that the communication via the communication line is abnormal.

As described before, the electric power is supplied via the current supply path 211 and the current supply path 212 from the auxiliary battery 19 to the hybrid ECU 41. In addition, the electric power is supplied via "the current supply path 211 and the current supply path 211a" and "the current supply path 212 and the current supply path 212a" from the auxiliary battery 19 to the brake ECU 42. Then, the brake ECU 42 monitors the electric potential of the current supply path 211a connected to the brake ECU 42, thereby determining whether the current supply path 211 is supplying the current or is shut off, and, based on the determination, determines "whether or not the electric power is supplied via the current supply path 211 to the hybrid ECU 41". Further, the brake ECU 42 monitors the electric potential of the current supply path 212a connected to the brake ECU 42, thereby determining whether the current supply path 212 is supplying the current or is shut off, and, based on the determination, determines "whether or not the electric power is supplied via the current supply path 212 to the hybrid ECU 41". In the following, the detection of the shutoff of the current supply path 211 by the brake ECU 42 is referred to as "detecting IG1_OFF", and the detection of the shutoff of the current supply path 212 by the brake ECU 42 is referred to as "detecting IG2_OFF".

The control apparatus 40 includes "an accumulator pressure sensor 43, a control pressure sensor 44, a pedal stroke sensor 45, and a brake switch 31b" illustrated in FIG. 4.

The accumulator pressure sensor 43 detects an accumulator pressure Pacc in the power hydraulic pressure generation unit 33 (specifically an accumulator), and outputs a signal representing the detected accumulator pressure Pacc to the brake ECU 42.

The control pressure sensor 44 detects a control pressure Px adjusted by the hydraulic pressure control valve unit 35, and outputs a signal representing the detected control pressure Px to the brake ECU 42.

The pedal stroke sensor 45 detects an operation amount (pedal stroke) Sp of the brake pedal 31a of the brake operation unit 31 by the driver, and outputs a signal representing the detected pedal stroke Sp to the brake ECU 42.

The brake switch 31b outputs a Hi signal to the brake ECU 42 when the brake pedal 31a is operated, and outputs a Lo signal to the brake ECU 42 when the brake pedal 31a is not operated.

A description is now given of the brake cooperative control carried out by the control apparatus 40 (more specifically, the hybrid ECU 41 and the brake ECU 42). When the hybrid ECU 41 brakes the vehicle 10, the hybrid ECU 41 controls the regeneration operation of the electric motor 14. As a result, the electric motor 14 generates regeneration braking forces on the wheels 17F. When the brake ECU 42 brakes the vehicle 10, the brake ECU 42 controls the operation of the friction brake apparatus 30 to adjust wheel cylinder pressures. As a result, the brake unit 34 generates friction braking forces on the wheels 17F and 17R. The brake cooperative control according to this embodiment calculates a target total braking force for braking the vehicle 10 by the brake ECU 42. Then, the hybrid ECU 41 and the brake ECU 42 cooperate with each other to generate friction braking forces and regeneration braking forces on the wheels 17F and 17R so as to generate the target total braking force.

More specifically, when the driver operates the brake pedal 31a, the brake switch 31b transmits the Hi signal to the brake ECU 42. Thus, the Hi signal can be considered as a signal representing a braking request. The brake ECU 42 receives the Hi signal (braking request). The brake ECU 42 acquires the pedal stroke Sp based on the signal transmitted from the pedal stroke sensor 45 in response to the braking request, and calculates the target total braking force corresponding to a magnitude of the acquired pedal stroke Sp. It should be noted that the brake ECU 42 calculates the target total braking force so that the target total braking force increases as the pedal stroke Sp increases.

The brake ECU 42 transmits a signal representing a magnitude of the calculated target total braking force via the communication line to the hybrid ECU 41. The hybrid ECU 41 receives the signal transmitted via the communication line from the brake ECU 42. The hybrid ECU 41 determines a magnitude of a target regeneration braking force to be generated on the wheels 17F by the electric motor 14 based on the magnitude of the target total braking force represented by the received signal. Further, the hybrid ECU 41 determines the magnitude of the target regeneration braking force also based on a state of charge (SOC) of the main battery 18. On this occasion, the hybrid ECU 41 determines the target regeneration braking force as large as possible in a range that does not cause the main battery 18 to enter an overcharged state. It should be noted that the electric motor 14 generates the regenerative electric power when the electric motor 14 generates the regeneration braking force.

The hybrid ECU 41 transmits a signal representing a magnitude of the calculated target regeneration braking force via the communication line to the brake ECU 42. The brake ECU 42 receives the signal transmitted via the communication line from the hybrid ECU 41. The brake ECU 42 subtracts the magnitude of the target regeneration braking force represented by the received signal from the target total braking force to determine a magnitude of a target friction braking force to be generated on the wheels 17F and 17R by the friction brake apparatus 30.

The hybrid ECU 41 controls the electric motor 14 to operate for generating a regeneration braking force matching the target regeneration braking force on the wheels 17F. The brake ECU 42 controls the friction brake apparatus 30 to operate for generating a friction braking force matching the magnitude of the target friction braking force on the wheels 17F and 17R. The hybrid ECU 41 and the brake ECU 42 cooperate with each other to generate an actual braking force (a resultant force of the regeneration braking force and the friction braking force) matching the magnitude of the target total braking force on the wheels 17F and 17R in this way. The brake cooperative control has been summarized.

The hybrid ECU 41 and the brake ECU 42 each in the operation state transmit or receive the signals via the communication line at a predetermined frequency (such as each time a predetermined period elapses) in the cooperative control as described before. The hybrid ECU 41 can precisely recognize the magnitude of the target total braking force by means of the transmission/reception of the signals to determine the magnitude of the target regeneration braking force. The brake ECU 42 can precisely recognize the magnitude of the target regeneration braking force by means of the transmission/reception of the signals to determine the magnitude of the target friction braking force. When the vehicle 10 is braked by the brake cooperative control in this way, the hybrid ECU 41 and the brake ECU 42 need to generate the braking force matching the target total braking force on the wheels 17F and 17R while communicating with each other.

However, the communication between the hybrid ECU 41 and the brake ECU 42 is not always maintained in an excellent state. For example, when some abnormality (a failure such as disconnection or influence of a noise) occurs to the communication line itself built in the vehicle 10, the hybrid ECU 41 and the brake ECU 42 cannot normally communication with each other. In this case, the hybrid ECU 41 cannot recognize the magnitude of the target total braking force (further the magnitude of the friction braking force), and the brake ECU 42 cannot recognize the magnitude of the regeneration braking force. Thus, the hybrid ECU 41 and the brake ECU 42 may not generate the braking force matching the target total braking force on the wheels 17F and 17R.

Therefore, when an abnormality occurs to the communication between the hybrid ECU 41 and the brake ECU 42 (hereinafter simply referred to as "when the communication abnormality occurs"), the hybrid ECU 41 solely gradually decreases the magnitude of the target regeneration braking force (for example, to zero) as the time elapses. Further, when the communication abnormality occurs, the brake ECU 42 solely gradually increases the magnitude of the target friction braking force (for example, to the magnitude of the target total braking force) as the time elapses. In this case, a decrease rate of the target regeneration braking force and an increase rate of the target friction braking force are determined in advance so that the magnitude of the resultant force (actual braking force) of the regeneration braking force and the friction braking force approximately matches the magnitude of the target total braking force. "Solely" means that the information acquired by the communication between the hybrid ECU 41 and the brake ECU 42 is not used.

When the communication abnormality occurs, the brake ECU 42 considers that the magnitude of the target regeneration braking force is gradually decreased by the hybrid ECU 41 as the time elapses in this way. Thus, the brake ECU 42 increases the magnitude of the target friction braking force to the magnitude of the target total braking force as the time elapses so as to compensate for the decrease in the target regeneration braking force, thereby increasing the braking fore applied by the friction brake apparatus 30 to the wheels 17F and 17R. As a result, the vehicle 10 is appropriately decelerated at a deceleration desired by the driver, and represented by the operation on the brake operation unit 31.

The communication abnormality between the hybrid ECU 41 and the brake ECU 42 occurs also when any one of the hybrid ECU 41 and the brake ECU 42 is in the non-operation state, and the other one is in the operation state. The state where any one of the ECUs is in the non-operation state occurs, for example, when the power supplied to the ECUs from the auxiliary battery 19 is shut off, and any one of the ECUs is earlier brought into the non-operation state. The electric power supplied to the ECUs from the auxiliary battery 19 is shut off when the main switch 22 is operated for switching by the occupant during the travel of the vehicle 10 so that the first relay 221 and the second relay 222 are switched from the closed state to the open state.

When the electric power supplied from the auxiliary battery 19 to the hybrid ECU 41 and the brake ECU 42 is shut off, the hybrid ECU 41 completes predetermined shutdown processing prior to the brake ECU 42. More specifically, when the power supply is shut off, the hybrid ECU 41 uses the backup power supply to quickly switch the main relay 206 from the closed state to the open state, thereby shutting off the current supply from the main battery 18 to the electric motor 14 so as to prevent the regeneration operation of the electric motor 14. Then, the hybrid ECU 41 enters the non-operation state prior to the brake ECU 42. Therefore, after the hybrid ECU 41 stops, the brake ECU 42 cannot communicate to/from the hybrid ECU 41. Thus, the brake ECU 42 determines that the communication abnormality has occurred between the brake ECU 42 and the hybrid ECU 41 until the stop after the hybrid ECU 41.

Thus, when the power supply to the hybrid ECU 41 and the brake ECU 42 from the auxiliary battery 19 is shut off during the braking of the vehicle 10, the hybrid ECU 41 immediately stops the regeneration operation of the electric motor 14, and the magnitude of the regeneration braking force by the electric motor 14 rapidly decreases to zero. However, the brake ECU 42 determines that the communication error has occurred between the brake ECU 42 and the hybrid ECU 41 when a countermeasure described later is not taken, and hence the brake ECU 42 gradually increases the magnitude of the target friction braking force to the magnitude of the target total braking force as the time elapses. As a result, while the regeneration braking force is being generated, when the power supply from the auxiliary battery 19 is shut off, and, as a result, the communication between the hybrid ECU 41 and the brake ECU 42 is not available, the magnitude of the actual braking force generated on the wheels 17F and 17R becomes insufficient with respect to the target total braking force. As a result, the occupants on the vehicle 10 may feel sense of discomfort.

(Operation)

Figure 5:
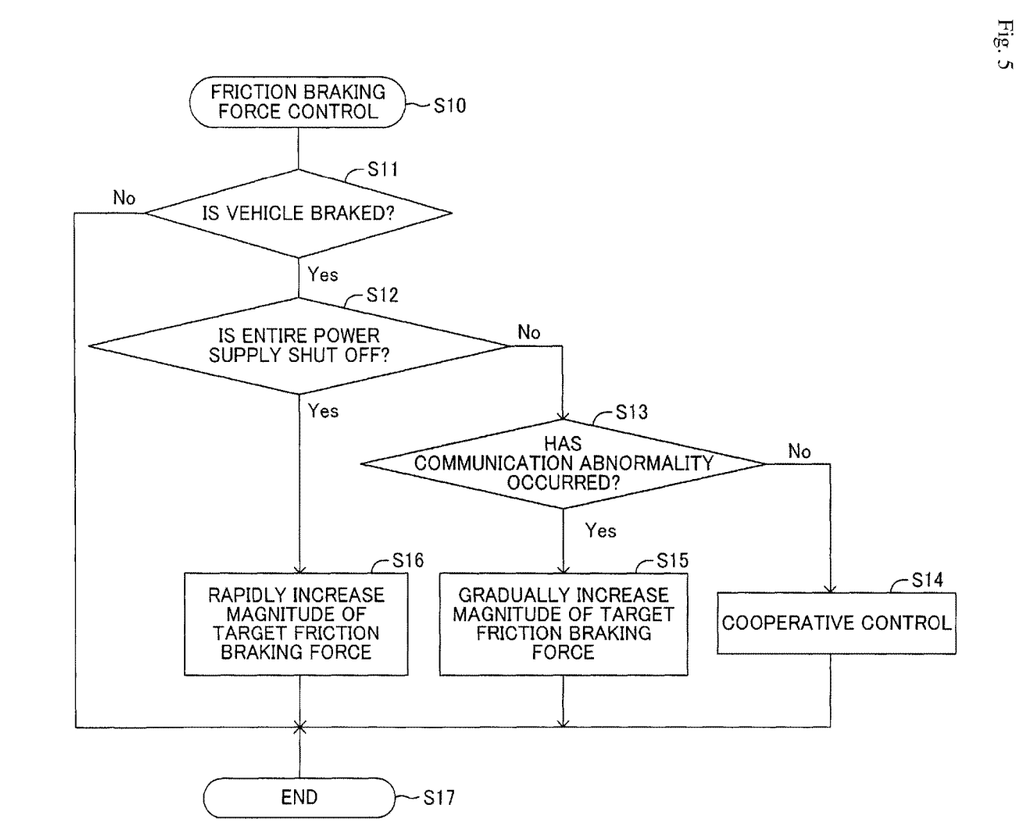
FIG. 5 is a flowchart of a friction braking force control program executed by a brake ECU in FIG. 1.

The brake ECU 42 according to this embodiment executes a friction braking force control program illustrated in FIG. 5 to avoid the occurrence of "the case where the braking force is insufficient when the power supply is shut off" described before. In Step S10, the brake ECU 42 starts the execution of the friction braking force control program each time after a predetermined short period elapses.

After the brake ECU 42 starts the execution of the program in Step S10, in Step S11, the brake ECU 42 determines whether the vehicle 10 is braked or not, in other words, the braking request is generated or not, based on the signal from the brake switch 31b. Specifically, when the signal from the brake switch 31b is the Hi signal, the brake ECU 42 determines that the braking request is generated. In this case, in Step S11, the brake ECU 42 makes a determination "Yes", and proceeds to Step S12.

On the other hand, when the signal from the brake switch 31b is the Lo signal, the braking request is not generated, and, in Step S11, the brake ECU 42 thus makes a determination "No". In this case, the brake ECU 42 proceeds to Step S17, and once finishes the execution of the friction braking force control program. In other words, in this case, the braking request is not generated, and the vehicle does not need to be braked, and hence after, in Step S11, the brake ECU 42 makes the determination "No", in Step S17, the brake ECU 42 once finishes the execution of the friction braking force control program.

When, in Step S11, the brake ECU 42 determines that the vehicle is braked (braking request is generated), the brake ECU 42 executes respective pieces of step processing of the friction braking force control program depending on the following cases (A) to (C):

(A) Power supply to hybrid ECU 41 is not shut off, and communication is normal;
(B) Power supply to hybrid ECU 41 is not shut off, and communication is abnormal; and
(C) Power supply to hybrid ECU 41 is shut off.

A description thereof is now given in sequence.

(A) Power Supply to Hybrid ECU 41 is Not Shut Off, and Communication is Normal

In Step S12 following Step S11, the brake ECU 42 determines whether or not the power supply to the hybrid ECU 41 from the auxiliary battery 19 is completely shut off. More specifically, the brake ECU 42 determines whether or not both IG1_OFF and IG2_OFF are detected. In the case of (A), the power supply to the hybrid ECU 41 is not shut off, and hence at least one of IG1_OFF or IG2_OFF is not detected.

Thus, in Step S12, the brake ECU 42 makes a determination "No", proceeds to Step S13, and determines whether or not an abnormality occurs on the communication between the hybrid ECU 41 and the brake ECU 42 based on the method described before. In the case of (A), the communication between these ECUs is normal. Thus, in Step S13, the brake ECU 42 makes a determination "No", proceeds to Step S14, and carries out the brake cooperative control. Then, the brake ECU 42 proceeds to Step S17, and once finishes the execution of this program. As a result, the magnitude of the actual braking force, which is the resultant force of the friction braking force and the regeneration braking force, is controlled to match the target total braking force.

(B) Power Supply to Hybrid ECU 41 is Not Shut Off, and Communication is Abnormal In this case, the brake ECU 42 makes the determination "No", in Step S12 which follows Step S11, proceeds to Step S13, makes a determination "Yes" in Step S13, and proceeds to Step S15.

In Step S15, the brake ECU 42 gradually increases the magnitude of the target friction braking force as the time elapses. Specifically, when the abnormality occurs to the communication between the hybrid ECU 41 and the brake ECU 42, the hybrid ECU 41 gradually decreases the magnitude of the target regeneration braking force as the time elapses as described before. Therefore, the brake ECU 42 gradually increases the magnitude of the target friction braking force to the magnitude of the target total braking force so as to compensate for the decrease in the target regeneration braking force as the time elapses. As a result, the braking force applied by the friction brake apparatus 30 to the wheels 17F and 17R gradually increases. As a result, the actual braking force approximately matches the target total braking force. In other words, a magnitude of an increase rate of the target friction braking force in this case is set in advance so as to match a magnitude of a decrease rate of the target regeneration braking force. Then, the brake ECU 42 proceeds to Step S17, and once finishes the execution of this program.

(C) Power Supply to Hybrid ECU 41 is Shut Off

In this case, both IG1_OFF and IG2_OFF are detected. Thus, in Step S12 following Step S11, the brake ECU 42 makes a determination "Yes", and proceeds to Step S16.

In Step S16, the brake ECU 42 rapidly increases the magnitude of the target friction braking force to the magnitude of the target total braking force at an increase rate more than "the increase rate when the target friction braking force is gradually increased as the time elapses in Step S15". In other words, in the case of (C), the power supply to the hybrid ECU 41 is shut off, the hybrid ECU 41 immediately finishes the regeneration operation of the electric motor 14, and, as a result, the regeneration braking force rapidly decreases. Therefore, the brake ECU 42 rapidly increases the magnitude of the target friction braking force so as to compensate for the rapid decrease in the target regeneration braking force, thereby rapidly increasing the friction braking force. Thus, such a case that the actual braking force is severely insufficient with respect to the target total braking force can be avoided. Then, the brake ECU 42 proceeds to Step S17, and once finishes the execution of this program.

As appreciated from the description before, when an abnormality occurs to the communication between the hybrid ECU 41 and the brake ECU 42, and a cause of the communication abnormality is not the shutoff of the power supply to the hybrid ECU 41, the regeneration braking force is gradually decreased, and the friction braking force is gradually increased. Further, when an abnormality occurs to the communication between the hybrid ECU 41 and the brake ECU 42, and a cause of the communication abnormality is the shutoff of the power supply to the hybrid ECU 41, the regeneration braking force is rapidly decreased, and the friction braking force is rapidly increased. Thus, in any of the cases, the magnitude of the actual braking force, which is the resultant force of the actual regeneration braking force and the actual friction braking force, does not become severely insufficient with respect to the magnitude of the target total braking force, and a large variation amount is not generated in the deceleration. As a result, the occupants of the vehicle 10 are hard to feel a sense of discomfort.

(Operation of Modified Example)

Figure 6:
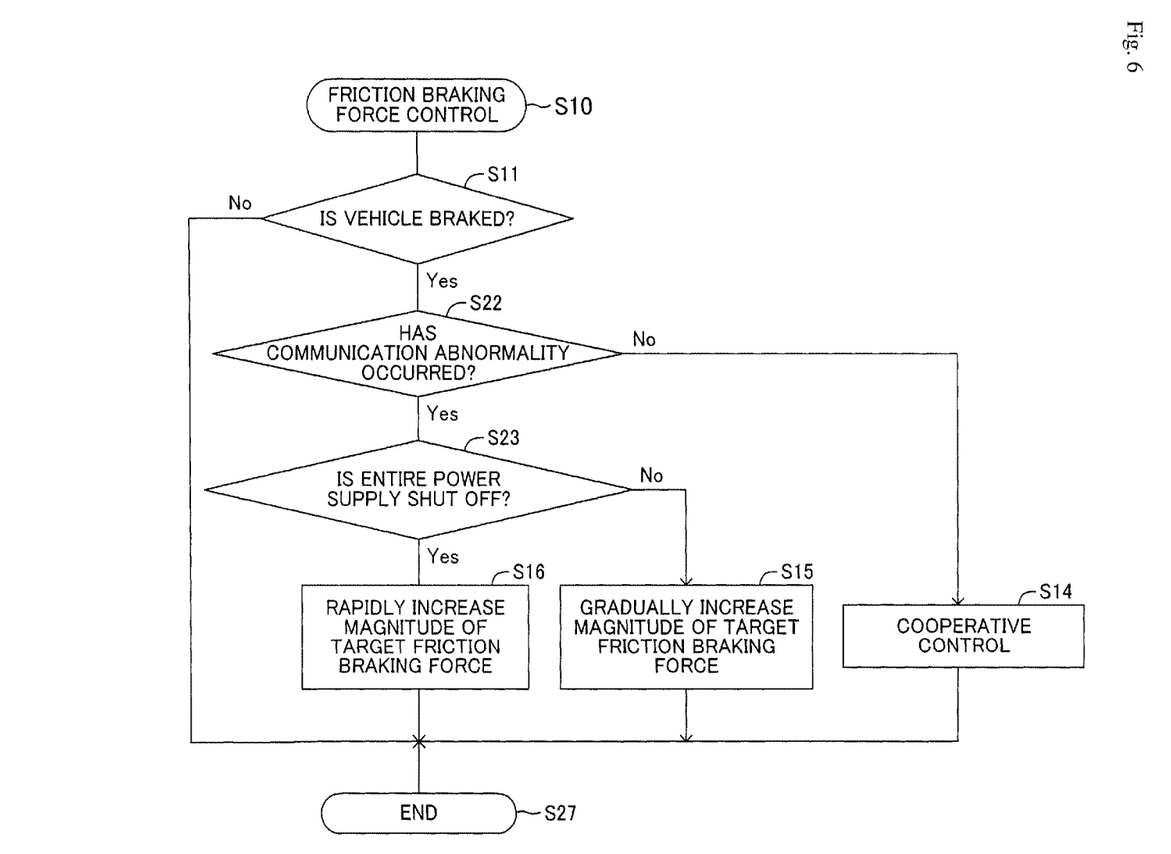
FIG. 6 is a flowchart illustrating a modified example of the friction braking force control program executed by the brake ECU in FIG. 1.

A description is now given of a modified example of the embodiment. The modified example is different from the embodiment only in such a point that the brake ECU 42 executes the friction braking force control program illustrated in FIG. 6 in place of FIG. 5 each time a predetermined period elapses. Thus, a description is now given mainly of the different point. Steps in which the same processing as that in the steps described before is performed out of the steps illustrated in FIG. 6 are denoted by the same reference numerals as those of the steps described before. A detailed description of the steps is properly omitted.

The brake ECU 42 starts the processing starting from Step S20 at the predetermined timing, proceeds to Step S11, and determines whether or not the vehicle 10 is braked. When the vehicle 10 is not braked (the braking request is not generated), in Step S11, the brake ECU 42 makes the determination "No", then directly proceeds to Step S27, and once finishes the execution of the program.

In contrast, when the vehicle 10 is braked (the braking request is generated), in Step S11, the brake ECU 42 makes the determination "Yes", proceeds to Step S22, and, as in Step S13, determines whether or not an abnormality has occurred in the communication between the hybrid ECU 41 and the brake ECU 42 by means the above-mentioned method. A description is now given of the independent cases (A) to (C) described above.

(A) Power Supply to Hybrid ECU 41 is Not Shut Off, and Communication is Normal In this case, the communication abnormality does not occur, and, in Step S22, the brake ECU 42 thus makes a determination "No", proceeds to Step S14, and carries out the brake cooperative control. Then, the brake ECU 42 proceeds to Step S27, and once finishes the execution of this program.

(B) Power Supply to Hybrid ECU 41 is Not Shut Off, and Communication is Abnormal In this case, in Step S22 following Step S11, the brake ECU 42 makes a determination "Yes", and proceeds to Step S23. In Step S23, as in Step S12, the brake ECU 42 determines whether or not the power supply to the hybrid ECU 41 from the auxiliary battery 19 is completely shut off. In other words, the brake ECU 42 determines whether or not both IG1_OFF and IG2_OFF are detected.

In the case of (B), the power supply to the hybrid ECU 41 is not shut off, and hence at least one of IG1_OFF or IG2_OFF is not detected. Thus, in Step S23, the brake ECU 42 makes a determination "No", proceeds to Step S15, and gradually increases the magnitude of the target friction braking force up to the magnitude of the target total braking force as the time elapses so as to compensate for the decrease in the gradually decreasing regeneration braking force. Then, the brake ECU 42 proceeds to Step S27, and once finishes the execution of this program.

(C) Power Supply to Hybrid ECU 41 is Shut Off

In this case, the hybrid ECU 41 enters the non-operation state earlier than the brake ECU 42, and the communication between the ECUs thus becomes abnormal. Thus, in Step S22 following Step S11, the brake ECU 42 makes the determination "Yes", and proceeds to Step S23. Further, in the case, the power supply to the hybrid ECU 41 is shut off, and hence both of IG1_OFF and IG2_OFF are detected. Thus, in Step S23, the brake ECU 42 makes the determination "Yes", and proceeds to Step S16.

Thus, in Step S16, the brake ECU 42 rapidly increases the magnitude of the target friction braking force to the magnitude of the target total braking force at an increase rate more than "the increase rate when the target friction braking force is gradually increased as the time elapses in Step S15". In other words, in the case of (C), the regeneration braking force rapidly decreases. Therefore, the brake ECU 42 rapidly increases the magnitude of the target friction braking force so as to compensate for the rapid decrease in the target regeneration braking force, thereby rapidly increasing the friction braking force. Thus, such a case that the actual braking force is severely insufficient with respect to the target total braking force can be avoided. Then, the brake ECU 42 proceeds to Step S17, and once finishes the execution of this program.

As described above, the vehicle according to the embodiment and the modified example includes a first control unit (hybrid ECU 41) and a second control unit (brake ECU 42).

The first control unit and the second control unit are configured to:

receive supply of electric power from a power supply (auxiliary battery 19); and communicate and cooperate with each other when the first control unit and the second control unit are each in an operation state so as to match an actual braking force, which is a resultant force of the regeneration braking force and the friction braking force, with a magnitude of a target total braking force (refer to Step S14 in FIG. 5 and FIG. 6).

Further the first control unit is configured to:

gradually decrease, when the first control unit determines that an abnormality occurs to communication to/from the second control unit, the regeneration braking force as time elapses; and finish, when the supply of the electric power from the power supply is shut off, the regeneration operation of the electric motor 14 to transition to a non-operation state.

In addition, the second control unit is configured to:

gradually increase, when the second control unit makes such a first determination that the supply of the electric power from the power supply to the first control unit is not shut off, and an abnormality occurs to the communication to/from the first control unit, the friction braking force as the time elapses (refer to Steps S12, S13, and S15 in FIG. 5 or Steps S22, S23 and S15 in FIG. 6); and increase, when the second control unit makes such a second determination that the supply of the electric power from the power supply to the first control unit is shut off, the friction braking force at an increase rate more than an increase rate when the first determination is made (when the process proceeds to Step S15) (refer to Steps S12 and S16 in FIG. 5 or Steps S22, S23, and S16 in FIG. 6).

Thus, when an abnormality occurs to the communication between the hybrid ECU 41 and the brake ECU 42, regardless of whether or not the communication abnormality is caused by the shutoff of the power supply to the hybrid ECU 41, the magnitude of the actual braking force, which is the resultant force of the actual regeneration braking force and the actual friction braking force, can be made close to the target total braking force. As a result, the occupants of the vehicle 10 are hard to feel a sense of discomfort.

The present invention is not limited to the above-mentioned embodiment, and various modified examples can be adopted within the scope of the present invention.

For example, the number of the current supply paths to the control apparatus 40 is two according to the embodiment. Therefore, even when a state where one of the current supply paths is temporarily disconnected, or a noise is generated on one of the current supply paths occurs, the power supply to the hybrid ECU 41 can be continued. However, the number of the current supply paths to the control apparatus 40 is not limited to two. A description is now given of a case where the number of the current supply paths (and the relays) is changed.

A description is first given of a case where the power supply circuit 21 includes only one current supply path (such as the current supply path 211), and the main switch 22 includes only one relay (such as the first relay 221) interposed in the one current supply path. In this case, the hybrid ECU 41 receives the supply of the electric power via only the current supply path 211 from the auxiliary battery 19. The brake ECU 42 receives the supply of the electric power via only "the one path constructed by the current supply path 211 and the current supply path 211a" from the auxiliary battery 19. Thus, when the brake ECU 42 detects IG1_OFF, the power supply to the hybrid ECU 41 from the auxiliary battery 19 is completely shut off.

Thus, in this aspect, when the brake ECU 42 detects the IG1_OFF in Step S12 in FIG. 5 and Step S23 in FIG. 6, the brake ECU 42 determines that the entire power supply to the hybrid ECU 41 is shut off.

A description is now given of a case where the power supply circuit 21 includes three or more current supply paths, and the main switch 22 includes three or more relays interposed respectively in the three or more current supply paths. In this case, the hybrid ECU 41 receives the supply of the electric power via the three or more current supply paths from the auxiliary battery 19. The brake ECU 42 receives the supply of the electric power via the current supply paths (electric power supply lines) from "the respective portions connecting the three or more relays and the hybrid ECU 41 with each other" from the auxiliary battery 19. Thus, when the brake ECU 42 monitors electric potentials of the current supply paths (electric power supply lines), thereby detecting the shutoff of all the current supply paths, the power supply to the hybrid ECU 41 from the auxiliary battery 19 is completely shut off.

Thus, in this aspect, when, in Step S12 in FIG. 12 and in Step S23 in FIG. 6, the brake ECU 42 detects the shutoff of the current supply paths, the brake ECU 42 determines that the entire power supply to the hybrid ECU 41 is shut off.

When an abnormality occurs in the communication between the hybrid ECU 41 and the brake ECU 42, the hybrid ECU 41 decreases the magnitude of the target regeneration braking force (actual regeneration braking force) to zero according to the embodiment. In this case, the brake ECU 42 increases the magnitude of the target friction braking force (actual friction braking force) up to the magnitude of the target total braking force in order to compensate for the decrease in the magnitude of the target regeneration braking force (actual regeneration braking force). In this case, the hybrid ECU 41 does not need to decrease the magnitude of the target regeneration braking force (actual regeneration braking force) to zero. In other words, the hybrid ECU 41 may decrease the magnitude of the target regeneration braking force (actual regeneration braking force) down to a magnitude of the regeneration braking force larger than zero when the magnitude of the target regeneration braking force is such a level that the occupants do not feel the sense of discomfort even when the magnitude of the target regeneration braking force is added to the magnitude of the target total braking force.

When the brake pedal 31a of the brake operation unit 31 is operated by the driver, the brake ECU 42 acquires the Hi signal transmitted from the brake switch 31b as the braking request according to the embodiment. On this occasion, the braking request is a request generated when the vehicle 10 is to be braked. Thus, the braking request is generated also, for example, when the vehicle speed of the vehicle 10 is automatically decreased. The braking request is generated also, for example, when the vehicle speed is automatically decreased in order to avoid collision between the vehicle 10 and an obstacle ahead. Further, the braking request is generated also, for example, when the vehicle speed of the vehicle 10 is automatically decreased to stabilize a travel behavior of the vehicle 10. The brake ECU 42 can acquire the braking request generated in these cases. Then, the brake ECU 42 can acquire the braking request generated in these cases, thereby executing the friction driving force control program illustrated in FIGS. 5 and 6.

The brake ECU 42 acquires the signal representing the pedal stroke Sp from the pedal stroke sensor 45 according to the embodiment. Then, the brake ECU 42 uses the magnitude of the pedal stroke Sp to determine the target total braking force. In this case, the brake ECU 42 may use the magnitude of the hydraulic pressure generated by the master cylinder unit 32 in response to the operation by the driver on the brake pedal 31a of the brake operation unit 31 to determine the target total braking force. Further, the brake ECU 42 may use a magnitude of a depression force input by the driver to the brake pedal 31a of the brake operation unit 31 to determine the target total braking force.

The hybrid vehicle 10 including the engine 11 and the electric motor 14 is employed according the embodiment. The hybrid vehicle 10 includes a plug-in type hybrid vehicle which can use an external power supply to charge the main battery 18. Further, an electric vehicle on which the engine 11 is not installed may be employed in place of the hybrid vehicle 10 employed in the embodiment and the modified example.

The main battery 18 is constructed by a rechargeable battery according to the embodiment. In this case, the main battery 18 may be constructed by a high-capacity capacitor (electric double layer capacitor). In other words, the main battery 18 may be any electric power buffer as long as the electric power buffer can temporarily accumulate the regenerative electric power by the motor-generator 13 and the electric motor 14 or electric power from an external power supply, and can supply the electric motor 14 with the accumulated electric power.

The single auxiliary battery 19 is installed on the vehicle 10 according to the embodiment. In this case, a plurality of (such as two) auxiliary batteries 19 may be installed on the vehicle 10. In this case, for example, the current supply path 211 of the power supply circuit 21 is connected to one auxiliary battery 19, and the other auxiliary battery 19 is connected to the current supply path 212. The currents are supplied via the current supply paths 211 and 211a and the current supply paths 212 and 212a of the power supply circuit 21 to the hybrid ECU 41 and the brake ECU 42.

The main switch 22 including the operation button on which the depression operation is carried out by the occupant is employed according to the embodiment and the modified example. In this case, for example, a main switch 22 rotationally operated such as an ignition key switch may be employed in place of the main switch 22. The ignition key is rotationally operated by the driver on the ignition key switch. Therefore, for example, when the ignition key is rotationally operated by the driver up to a predetermined rotational operation angle, the first relay 221 is brought into the open state (or the closed state). When the ignition key is further rotationally operated by the driver, the second relay 222 is brought into the open state (or the closed state) in addition to the first relay 221.

Further, the friction brake apparatus 30 using the hydraulic pressure, for supplying the hydraulic pressure of the working fluid to the brake unit 34 is employed as the friction-type braking apparatus according to the embodiment. In this case, for example, an electric disc brake apparatus for pressing brake pads against a disc rotor by an electric motor may be employed for embodiment as the friction-type braking apparatus.

The invention claimed is:
1. A vehicle, comprising:
an electric motor;
a first control unit for controlling a regeneration operation of the electric motor to control a regeneration braking force;
a friction-type braking apparatus for generating a friction braking force; and a second control unit for controlling an operation of the friction-type braking apparatus to control the friction braking force, the first control unit and the second control unit being configured to:

receive supply of electric power from a power supply; and communicate and cooperate with each other when the first control unit and the second control unit are each in an operation state so as to match an actual braking force, which is a resultant force of the regeneration braking force and the friction braking force, with a magnitude of a target total braking force;

the first control unit being configured to:

gradually decrease, when the first control unit determines that an abnormality occurs to communication to/from the second control unit, the regeneration braking force as time elapses; and finish, when the supply of the electric power from the power supply is shut off, the regeneration operation of the electric motor to transition to a non-operation state, the second control unit being configured to:

gradually increase, when the second control unit makes such a first determination that the supply of the electric power from the power supply to the first control unit is not shut off, and an abnormality occurs to the communication to/from the first control unit, the friction braking force as the time elapses; and increase, when the second control unit makes such a second determination that the supply of the electric power from the power supply to the first control unit is shut off, the friction braking force at an increase rate more than an increase rate when the first determination is made.

2. A vehicle according to claim 1, wherein:

the first control unit is configured to receive the supply of the electric power from the power supply via a plurality of current supply paths for connecting the power supply and the first control unit to each other; and the second control unit is configured to determine, when the second control unit determines that all the plurality of current supply paths are shut off, that the supply of the electric power from the power supply to the first control unit is shut off.

3. A vehicle according to claim 2, further comprising:

a manual switch to be operated by an occupant; and relays to be opened or closed in response to an operation on the manual switch, the relays being interposed in the respective plurality of current supply paths, wherein the second control unit is configured to connect to portions for connecting the respective relays and the first control unit to each other on the respective plurality of current supply paths.

* * * * *